United States Patent
Stark et al.

(10) Patent No.: US 6,701,960 B1
(45) Date of Patent: Mar. 9, 2004

(54) DOUBLE CONE FOR GENERATION OF A PRESSURE DIFFERENCE

(75) Inventors: John Herman Stark, Wattenwil (CH); Hansjörg Wagenbach, Biel (CH); Paul Werner Straub, Frauenkappelen (CH)

(73) Assignee: DCT Double-Cone Technology AG (CH)

( * ) Notice: Subject to any disclaimer, the term of this patent is extended or adjusted under 35 U.S.C. 154(b) by 0 days.

(21) Appl. No.: 10/070,482

(22) PCT Filed: Aug. 31, 1999

(86) PCT No.: PCT/CH99/00403
§ 371 (c)(1),
(2), (4) Date: Feb. 27, 2002

(87) PCT Pub. No.: WO01/16493
PCT Pub. Date: Mar. 8, 2001

(51) Int. Cl.[7] .................................................. F15C 1/18
(52) U.S. Cl. ....................... 137/842; 137/803; 137/888; 137/565.22
(58) Field of Search ................... 137/803, 888, 137/565.22, 842

(56) References Cited

U.S. PATENT DOCUMENTS

| | | | |
|---|---|---|---|
| 2,677,389 A | * 5/1954 | Jisha et al. | 137/565.22 |
| 3,556,409 A | * 1/1971 | Johannisson | 239/433 |
| 3,656,495 A | * 4/1972 | Noren | 137/832 |
| 3,912,470 A | * 10/1975 | Fluckiger | 96/106 |
| 3,933,113 A | * 1/1976 | Dornak, Jr. | 114/151 |
| 4,027,407 A | 6/1977 | Kiss | |
| 4,041,984 A | * 8/1977 | Morel | 137/842 |
| 4,190,537 A | 2/1980 | Tondreau et al. | |
| 4,542,775 A | * 9/1985 | Beck | 141/65 |
| 4,625,744 A | 12/1986 | Arnaudeau | |
| 4,917,151 A | * 4/1990 | Blanchard et al. | 137/815 |
| 5,311,907 A | * 5/1994 | Houck | 137/810 |
| 5,797,420 A | * 8/1998 | Nowicki et al. | 137/216 |
| 5,863,128 A | * 1/1999 | Mazzei | 366/163.2 |
| 6,427,724 B2 | * 8/2002 | Hua | 137/888 |

FOREIGN PATENT DOCUMENTS

| | | |
|---|---|---|
| CH | 689722 | 9/1999 |
| DE | 972270 | 6/1959 |
| EP | 0599281 | 6/1994 |
| EP | 0612078 | 8/1994 |
| FR | 740179 | 1/1933 |
| FR | 2239142 | 2/1975 |
| FR | 2580191 | 10/1986 |
| NL | 6555 C | 10/1921 |
| NL | 6811379 | 2/1970 |
| WO | 87/01770 | 3/1987 |
| WO | 98/58175 | 12/1998 |
| WO | 98/58176 | 12/1998 |
| WO | 99/08003 | 2/1999 |

OTHER PUBLICATIONS

M.L. Hoggarth, "The Design and Performance of HighPressure Injectors As Gas Jet Boosters", *Proceedings of the Institution of Mechanical Engineers*, vol. 185, No. 56/71, 1970–1971, pp. 755–765.

* cited by examiner

Primary Examiner—A. Michael Chambers
(74) Attorney, Agent, or Firm—Ostrolenk, Faber, Gerb & Soffen, LLP

(57) ABSTRACT

The lifetime of a double-cone device (21) for creating a pressure difference in a streaming fluid can be greatly increased by moving the inlet gap (5) into the exit cone (4). This results in a short so-called diffuser (22) being obtained between the gap (5) and the orifice (19), where entry cone (3) and exit cone (4) are connected. The increased lifetime permits the double-cone device to cope with much higher flow rates. Thus higher system pressures are created which enhance the use of the double-cone for such applications as the desalination of sea water by reverse osmosis.

The important application of the seperation of oil from water using a separating device such as a cyclone (57) working under elevated pressure is now feasible.

The increased power of the double-cone permits one to profit more fully from the new concept of reduction of the concentration of the feed supplied to the double-cone device (21).

31 Claims, 4 Drawing Sheets

DOUBLE CONE FOR GENERATION OF A PRESSURE DIFFERENCE

The present invention relates to double-cone devices according to claim 1, particularly of the type disclosed in WO-A-87/01770. It further relates to installations comprising double-cone devices.

Double-cone devices are described in the WO-A-87/01770 whose content is incorporated in this description by reference. The double-cone device, amongst other things, allows one to upgrade the available pumping pressure of a modest conventional pump. When incorporated in a compressor loop, such as proposed in the aforementioned patent, numerous novel possibilities become evident.

The double-cone device essentially consists of two cones which are connected by their ends of small diameter. At the interface, i. e. interspersed between entry cone and exit cone, an orifice is provided. In the region of the orifice, the double-cone device, if penetrated by a fluid, builds up a surprisingly low pressure which allows another fluid to be drawn into the device with high efficiency. When included in a closed loop with a pump, the pressure in this loop can be increased in that the double-cone unit sucks in fluid until an equilibrium is attained. The term fluid refers to both liquids and gases.

The double-cone device is characterized by the angles $\theta_1$ and $\theta_2$ of the conicity of the entry resp. the exit cone:

$$F=(1+\sin \theta_1)^{2}*\sin^2 \theta_2$$

The quality function F should always be less than 0.11. The ranges are detailed hereinafter:

| | |
|---|---|
| <0.0035: | best |
| 0.0035–0.0155 | very good |
| 0.0155–0.0250 | good |
| 0.0250–0.0500 | satisfying |
| 0.0500–0.1100 | still sufficient |
| >0.1100 | poor |

In practice, however, the known double-cone devices showed a rather short lifetime.

Therefore, one object of the present invention consists in providing a double-cone device of increased lifetime.

Another object of the present invention is to provide new applications of the double-cone device, particularly the one fulfilling the first mentioned object.

A double-cone device complying with at least one of these objects is given in claim 1. The further claims indicate preferred embodiments and uses satisfying even the second object.

Figure 1:
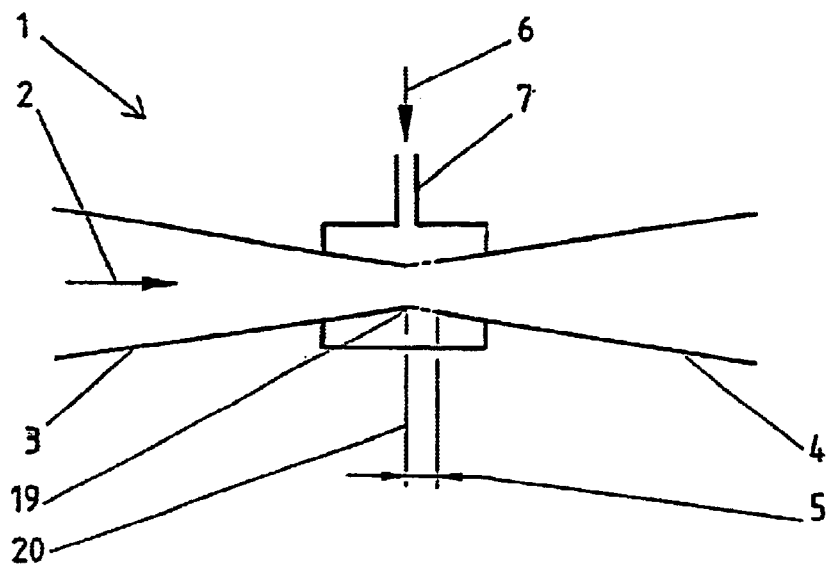
Figure 2:
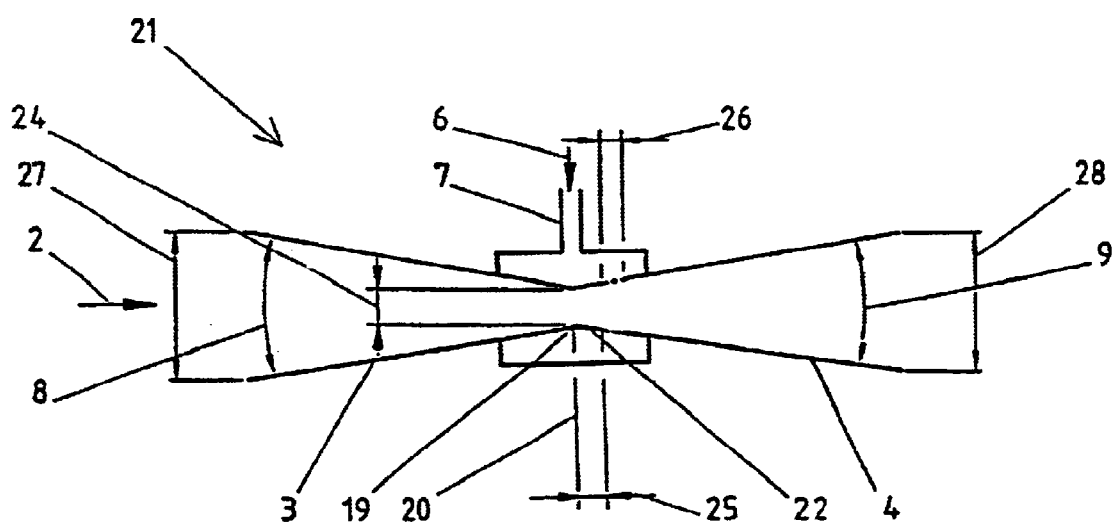
Figure 3:
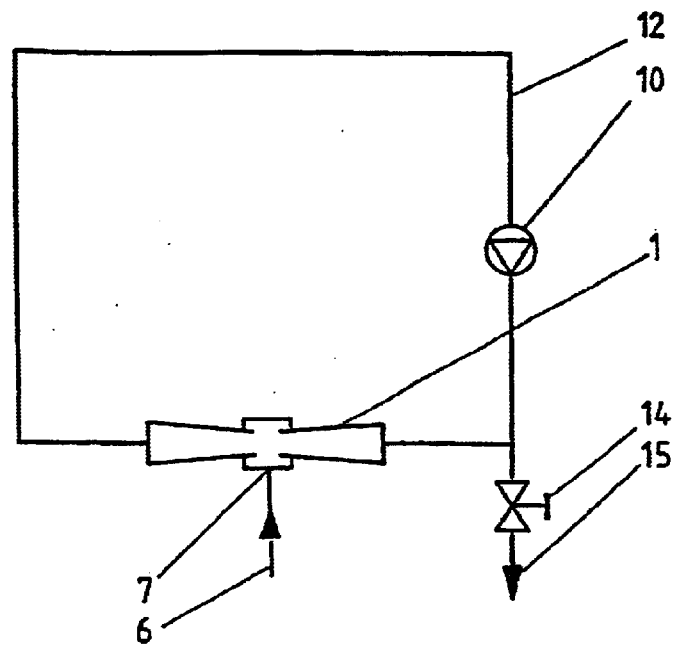
Figure 4:
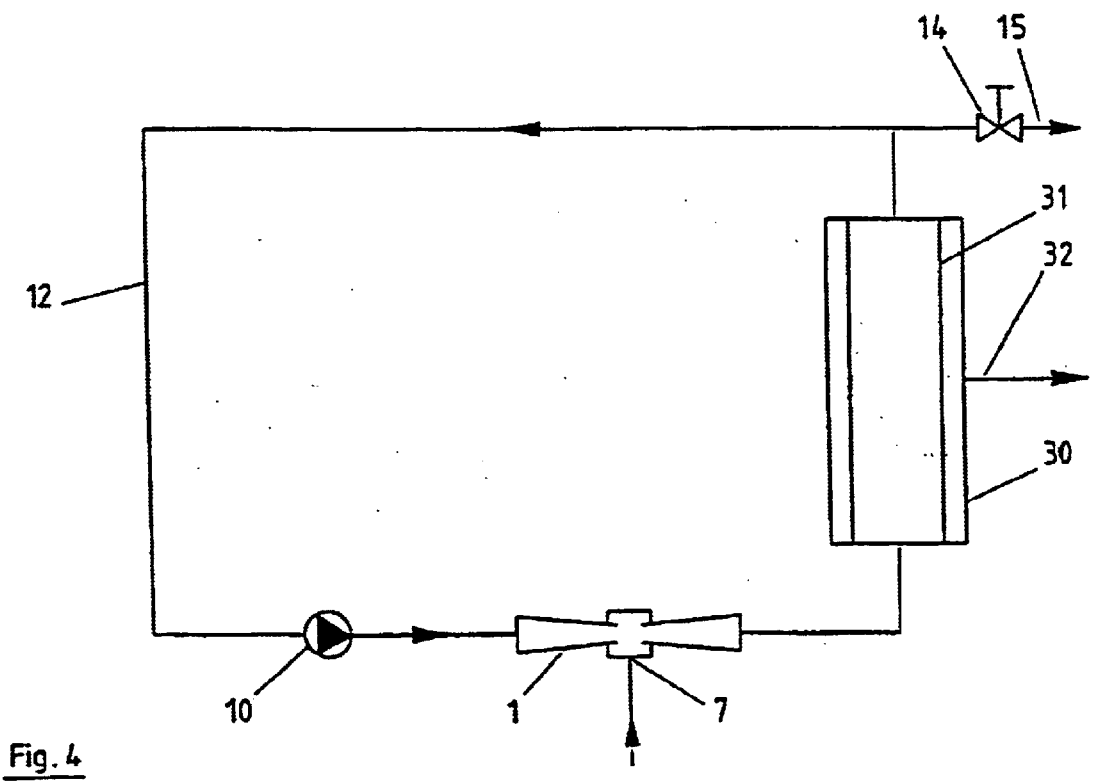
Figure 5:
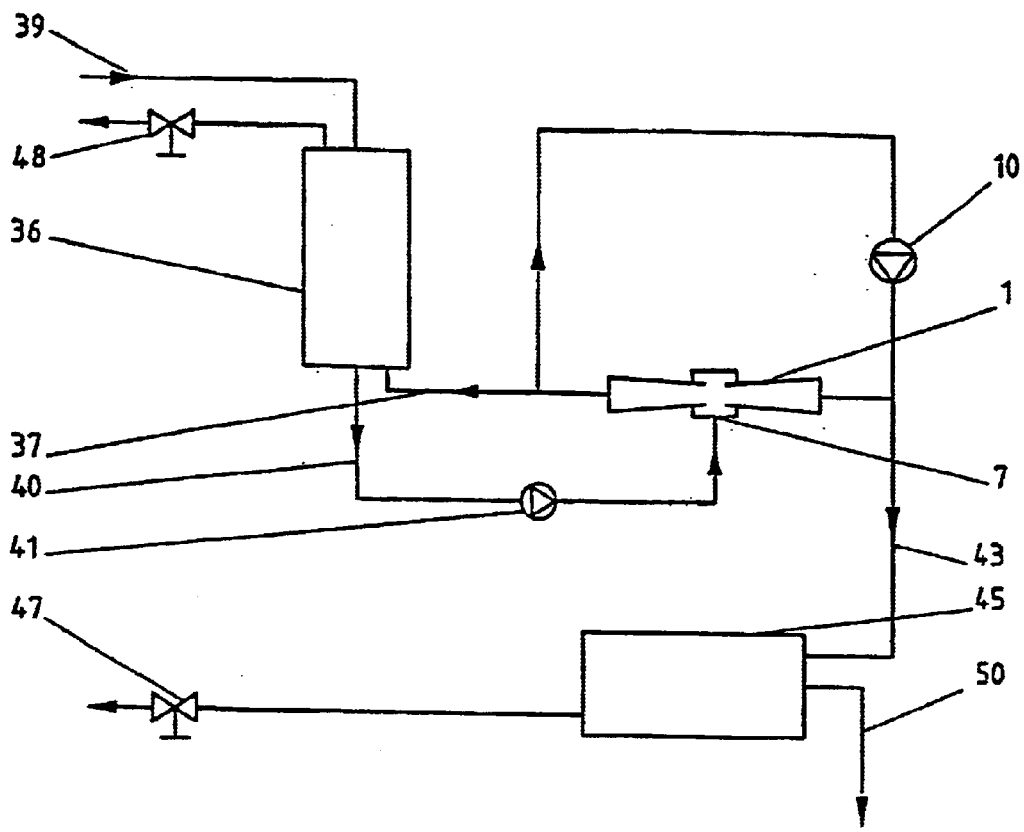
Figure 6:
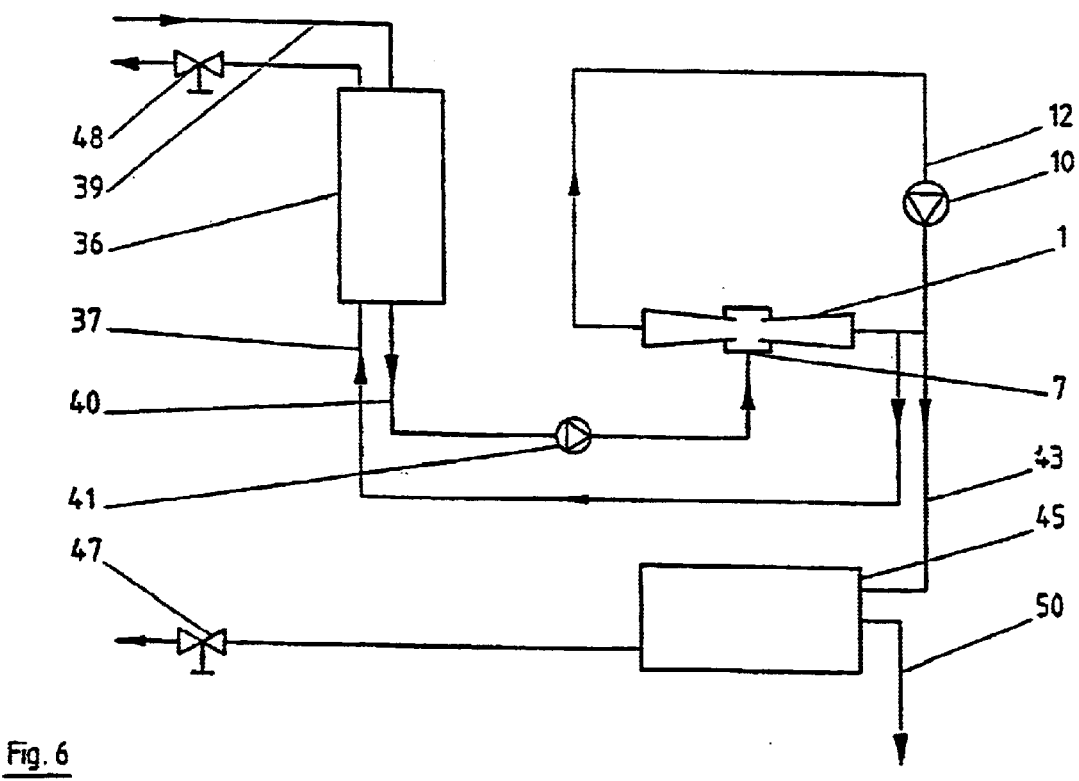
Figure 7:
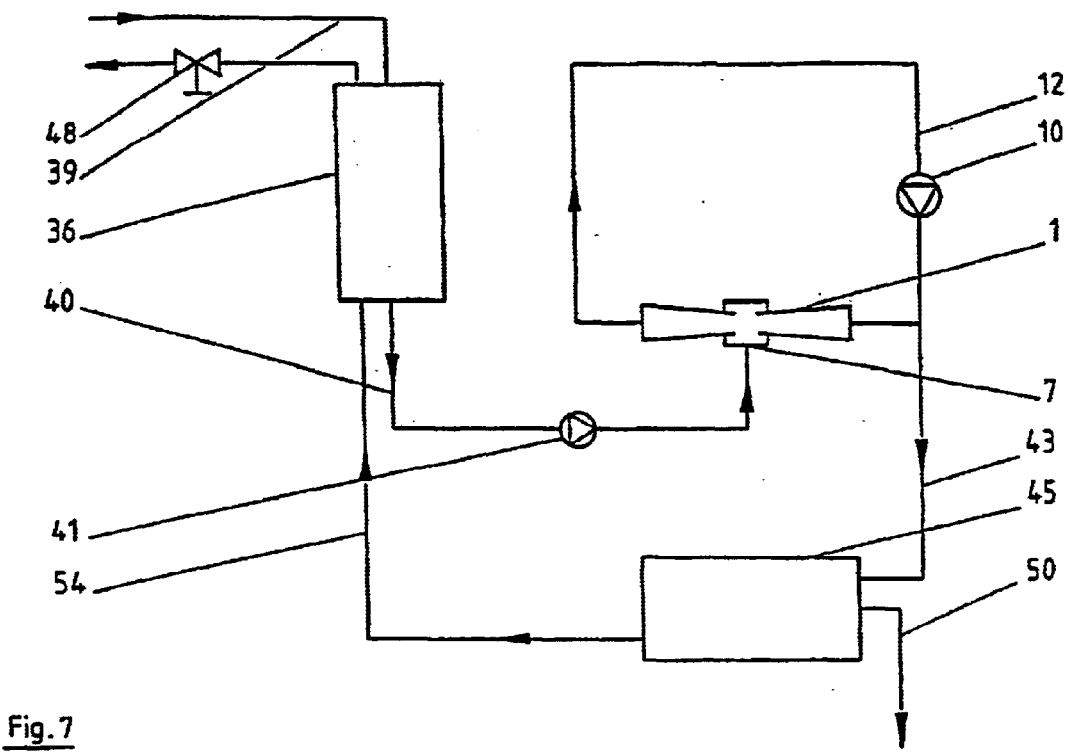

The invention will be described referring to Figures:

FIG. 1 Schematic illustration of a known double-cone device;

FIG. 2 Schematic illustration of a double-cone device according to the invention in a longitudinal section;

FIG. 3 Scheme of a known use of a double-cone device in a closed loop;

FIG. 4 Scheme of a first closed-loop system using a double-cone device;

FIG. 5 Scheme of a second closed-loop system using a double-cone device;

FIG. 6 Scheme of a third closed-loop system using a double-cone device;

FIG. 7 Scheme of a fourth closed-loop system using a double-cone device; and

Figure 8:
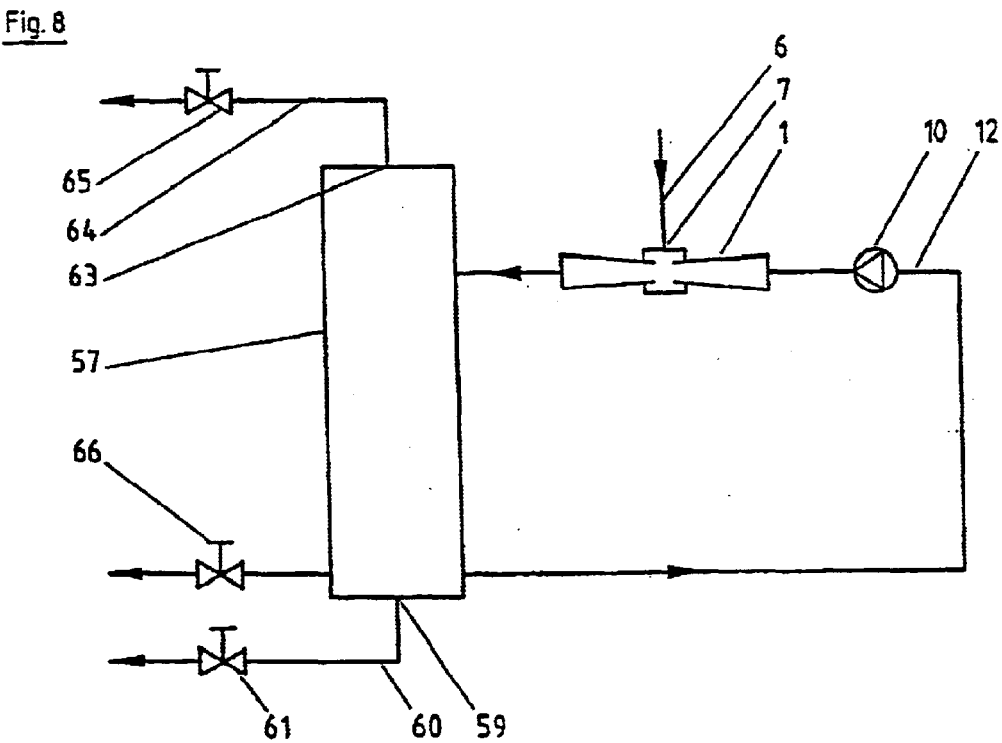

FIG. 8 Scheme of a fifth closed-loop system using a double-cone device.

Before defining the source of the problems, it is necessary to describe the functioning of the double-cone device and the basic compressor loop. The original patented double-cone device and the basic compressor loop are presented in FIGS. 1 and 3, respectively. These schematics will be used to describe their mode of functioning.

Referring to FIG. 1, the double-cone device 1 is fed with a feed flow 2 that enters the entry cone 3 and discharges into the exit cone 4. As the feed flow crosses the gap 5, material 6 may be drawn into the inlet 7 and, consequently, into the exit cone 4. The inlet flow rate is dependent on a number of parameters including geometrical ones as well as the feed flow rate and the external pressures at the inlet and downstream of the exit cone.

The conicity $q_1$ is the angle 8 between the walls of the entry cone 3, the conicity $q_2$ is the angle 9 of the walls of the exit cone 4.

The basic compressor loop, which we will refer to as a double-cone technology (DCT) pump, is presented in FIG. 3. The pump 10 circulates liquid through the double-cone device 1 and round the main loop 12. Material enters the double-cone inlet 7 and causes a pressure rise within the main loop 12. This system pressure P is adjusted via the regulating valve 14 which controls the outlet flow 15 from the main loop 12.

The first problem stems from the geometry of the double-cone device 1. On progressively increasing the amount of material drawn into the device, a level is reached where the double-cone starts to destroy itself. The destruction takes the form of material torn out of the wall downstream of the entry to the exit cone. This damage renders the double-cone device inefficient and excessively noisy.

The basic double-cone device as presented in the WO-A-87/01770 is reproduced in FIG. 1. It is seen that the orifice 19 lies on the inlet plane 20. By moving this inlet plane 20 downstream of the orifice 19, as displayed in FIG. 2, and respecting the double-cone geometry, the wear problem is virtually eliminated. Experimentally, it appears that the inlet material 6 drawn into the double-cone device 21 is not subjected to such an extreme stress and so the wall material is better able to resist. In order to achieve the same suction pressure as the original double-cone device more feed flow rate is required. However, the short diffuser 22 attached to the entry cone 3 of FIG. 2 also results in a lower pressure-drop across the complete double-cone device 21. Thus, for a given pressure-drop more feed flow can be achieved with the modified double-cone device 21. The net result is that a similar suction performance to that of the known double-cone device 1 may be obtained without the attendant cone damage. In fact, a lower pressure-drop is observed when comparing equivalent suctions.

Referring to FIG. 2, the orifice diameter 24 is represented by d and the small diffuser length 25 by L. The ratio of L to d is critical for the performance of the modified double-cone device 21. Values of L/d greater than 0.1 display improved life expectancy and overall performance. As the ratio of L/d is increased, the overall pressure-drop across the modified double-cone device 21 decreases. In contrast, the maximum compressor pressure that can be achieved for a given feed flow rate decreases. The optimal trade-off occurs close to the value of L/d which yields just adequate compressor pressure for the available feed flow rate.

Other parameters for a particularly advantageous layout of the double-cone device are:

Ratio h/d of gap width h 26 to orifice diameter d 24: 0<h/d<3, preferably 0.5<h/d<2;

ratio $D_{in}/d$ of entry diameter $D_{in}$ 27 to orifice diameter d: 2<$D_{in}/d$<∞, preferably 0.5<$D_{in}/d$<20;

ratio $D_{out}/d$ of exit diameter $D_{out}$ 28 to orifice diameter d: $2<D_{out}/d<\infty$, preferably $5<D_{out}/d<20$;

conicity 74 $_1$ 8 of entry cone: $0<\theta_1<10°$ (degree), preferably $\theta_1<8°$ and even more preferably $\theta_1<6°$; and conicity $\theta_2$ 9 of exit cone: $\theta_2 \leq \theta_1$.

A direct comparison between the performances of the basic double-cone device 1 of FIG. 1 and the improved double-cone device 21 of FIG. 2 may be derived from the following results:

| Working conditions: | |
|---|---|
| Feed flow rate | 8 m³/h |
| Inlet flow rate | 1 m³/h |
| System pressure P | 35 bar |

Observation

FIG. 1 device: Serious damage after only 20 minutes running time

FIG. 2 device: No damage apparent after 40 hours running time

In addition to the increased lifetime, the operating noise can be reduced by this measure.

As a consequence of the significantly improved characteristics of the double-cone device according to the invention, industrial applications are conceivable where high throughput at high pressure and a reasonable lifetime is necessary or at least advantageous. One such application is the purification of water containing unwanted components, particularly the desalination of sea-water by reverse osmosis.

In a first approach according to FIG. 4, the reverse osmosis filter 30 may be directly inserted in the main loop 12. The purified fluid, e. g. desalinated sea-water, is recovered at the exit line 32 of the osmosis unit 30. Concentrated fluid leaves the main loop 12 via line 15 and valve 14. In this configuration, the solute concentration builds up progressively to a high stable level within the actual compressor loop. Consequently, the separation membranes 31 are required to reject a much higher solute concentration than the one which existed originally in the untreated inlet supply. This results in an impaired solvent yield. Though, this layout of a purification system by reverse osmosis remains applicable, particularly under less demanding conditions, e. g. low concentrations of the matter to be separated.

The build-up of concentration within the compressor loop can be overcome by removing the separation membranes from the loop. This solution to the problem can introduce other difficulties because of the reduced membrane flushing. Typically, when functioning at high pressures, one may assume that only some 10% of the main feed flow rate is available for supplying the separation membranes when placed external to the compressor loop. In FIGS. 5 and 6 of this patent application, a rearranged system is proposed that completely overcomes all these problems.

The schemes proposed in FIGS. 5 and 6 function according to the new principle of concentration reduction prior to entry into the DCT Pump. Referring to FIG. 5, the membrane of the entry osmosis unit 36 is supplied through line 37 on the higher pressure side of its membrane from the DCT pump downstream of the double-cone device 1. Liquid crosses the membrane and enters the supply stream 39, so the supply liquid in conduit 40 after the entry osmosis unit 36 is diluted. An optional feed pump 41 helps pressurise this stream at the inlet 7 to the double-cone 1. This additional pressure greatly enhances the performance of the DCT pump 10, both with respect to the system pressure and inlet flow capacity that can be achieved. The diluted supply stream leaves the DCT Pump on the high pressure side of the circulating pump 10 through conduit 43 and enters the exit osmosis unit 45. The system pressure is regulated by means of the two flow regulating valves 47 and 48 where the concentrate leaves the installation. The purified liquid is collected at the solvent outlet 50.

For many low, medium and high pressure membranes that are currently available, pressure cannot be applied to the lower pressure side of the membrane for fear of rupturing the unit. Typically, less than 0.5 bar is specified for most spiral wound reverse osmosis and nanofilter units. Thus the optional pump 41 cannot be placed before the entry osmosis unit 36 in FIG. 5.

The advantage of this optional pump 47 is evident from the following results:

| | |
|---|---|
| Hydraulic power of the optional pump relative to that of the circulating pump | 9% |
| Net gain in relative hydraulic power at outlet from DCT Pump | 50% |

The logic behind the concentration reduction is that the incoming supply stream 39 is sufficiently concentrated to permit an exchange through a membrane by reverse osmosis between itself and a highly concentrated stream feeding the higher pressure side of the membrane. For example, 35 bar of pressure should counterbalance the inherent osmotic pressure across a semi-permeable membrane that is associated with an NaCl salt concentration gradient of at least 35 g/l (grams per litre). This compensation should be sufficient whether the membrane separates sea water from fresh water or sea water from a 70 g/l brine solution. In practise it has been observed, for a specific choice of membrane in the osmosis unit 36, that sea water reaches the DCT Pump with concentrations as low as 13 g/l.

The main difference between FIGS. 5 and 6 is that in FIG. 6, the conduit 52 which supplies the volume of liquid to the higher pressure side of the membrane in osmosis unit 36, branches off upstream of the pump 10 and upstream of the double-cone device 1 so that the volume of liquid supplied to the entry osmosis unit 36 does not have to pass through the double-cone 1. As a result, the circulating pump 10 for the FIG. 6 installation will use less power than in the FIG. 5 installation. However, for certain cases the highest pressure possible is required for each set of membranes, which could favour the choice of the FIG. 5 installation.

The installation shown in FIG. 7 specifically solves the problem associated with the membrane flushing requirement. The concentrate outlet of the exit osmosis unit 45 is connected to the entry osmosis unit 36 by the line 54. By so combining the concentrate lines from each block of membranes, the maximum volume of flushing liquid may be conserved. In addition, the membrane of osmosis unit 45 is able to function under more favourable conditions than those of the membrane of entry osmosis unit 36.

The separation of solids and/or dangerous contaminants from liquid carriers can present serious problems. If either reach the classic pumping device they can cause instant failure or provoke an explosion. Certainly, very expensive pumping equipment does exist for some explosive materials, but mostly one tries to side-track the problem.

For instance, the removal of crude oil from the sea has become a periodic nightmare in recent years. This contamination can be composed of light ends, which at best are highly inflammable, and heavy fractions which are of a tar-like consistency. In most instances this contamination can be traced to shipping leaks and often involves very large quantities spread over huge surface areas of sea. The removal of this pollutant poses a major problem even with today's level of technology.

Most ports are contaminated with waste oil and detritus. This material is progressively polluting the coastal fishing and pleasure areas creating a toxic sea environment. Any proposed clean-up will involve the handling of hitherto unimagined volumes of water. With the double-cone modifications proposed in this patent application, a scheme such as that outlined in FIG. 8 should offer the necessary potential to make a serious contribution to this problem.

In FIG. 8, a separating device (a separating column, tower or cyclone) 57 is inserted directly into the main loop 12 downstream of the double-cone unit 1. With this arrangement the contaminated inlet material 6 is drawn into the double-cone 1 and flushed directly into the separating column 57.

The least contaminated water returns to the main loop 12 from the lower portion of the separating device 57. Thus, the circulating pump 10 is virtually isolated from the contamination. Any solids that collect in the separating device 57 can be flushed from the base 59 of the separating device 57 via line 60 and valve 61, and the waste oil is recovered from the top 63 of the separating device 57 and guided through line 64 to outlet valve 65. The de-oiled sea water is ejected through valve 66. The efficiency of the separating device 57 depends to a large extent on the available pressure within the system. This is where the DCT pump will come into its own, because of its ability to upgrade the available working pressure of a very elementary high volume low pressure rugged pump as circulating pump 10.

The invention has been described by means of illustrative examples. However, the scope of protection relating to this invention is not restricted to the examples set forth but determined by the claims. It is clear that one skilled in the art will be able to see numerous variants derived from the basic concept. Some such modifications are presented below.

The addition of a second variable gap, whose inlet plane coincides with the orifice, introduces the possibility of temporarily increasing the available suction.

The exit cone downstream of the gap 5 can be sectioned so as to include several secondary gaps. In preference, each of these gaps is equipped with the possibility of partial or total closure. The secondary gaps can be chosen with various heights and/or distances from the orifice. The variable gaps, covering the range of fully open to closed, can be realised as follows:

A section can be removed from the exit cone and a shutter ring used to vary or completely close the gap.

A cut made through the exit cone and one part moved relative to the other.

One or several holes can be introduced in the wall of the exit cone with the possibility of varying the opening by means of either a shutter, shutter rings or valves.

The double cone modifications proposed above can be introduced into the applications and installations depicted in the main text.

The installations for implementing the new application can comprise more than one double-cone device, separating unit or pump. In particular, the double-cones can be arranged in parallel or in series. The parallel arrangements sometimes require individual flow controlling devices for each branch.

What is claimed is:

1. A double-cone device to create a pressure difference in a fluid flowing through the device, the device comprising:

an entry unit having a substantially frustoconical shape, the entry unit including first and second ends having respective diameters, the diameter of the first end of the entry unit being smaller than the diameter of the second end of the entry unit; and an exit unit having a substantially frustoconical shape, the exit unit including first and second ends having respective diameters, the diameter of the first end of the exit unit being smaller than the diameter of the second end of the exit unit;

the entry being coupled to the exit unit at the respective first ends to define an orifice and a longitudinal axis extending therethrough, the exit unit further including at least one inlet opening at a placement distance along the longitudinal axis from the first end of the exit unit such that a section of the exit unit between the first end of the exit unit and the inlet opening has an increasing diameter;

whereby at least one of noise and wear of the double-cone device is decreased;

wherein the orifice has a diameter, the inlet opening has a gap width, the entry unit has an entry diameter and an entry unit conicity, the exit unit has an exit diameter and an exit unit conicity, and a quality function of $(1+\sin (\text{the entry unit conicity}))^2 * \sin^2 (\text{the exit unit conicity})$ is at least one of less than and equal to 0.1100, the double-cone device including at least one of the following double-cone characteristics:

a) a ratio of the gap width to the diameter of the orifice is greater than 0 and less than 3, b) a ratio of the entry diameter of the entry unit to the diameter of the orifice is greater than 2, c) a ratio of the exit diameter of the exit unit to the diameter of the orifice is greater than 2, d) the entry unit conicity is greater than 0 degrees and less than 10 degrees, and e) the exit conicity is at least one of less than and equal to the entry unit conicity.

2. The double-cone device of claim 1, wherein the at least one inlet opening includes a hole.

3. The double-cone device of claim 2, wherein the hole defines a substantially circular crosscut.

4. The double-cone device of claim 1, wherein the at least one inlet opening includes a sequence of openings arranged on a circumference of a circle in a plane transverse to the longitudinal axis.

5. The double-cone device of claim 1, wherein the at least one inlet opening includes a circular gap.

6. The double-cone device of claim 5, wherein the circular gap is arranged essentially transverse to the longitudinal axis.

7. The double-cone device of claim 1, wherein the double-cone device includes all of the double-cone characteristics.

8. The double-cone device of claim 1, wherein the ratio of the gap width to the diameter of the orifice is greater than 0.5 and less than 2.

9. The double-cone device of claim 1, wherein the ratio of the entry diameter of the entry unit to the diameter of the orifice is greater than 5 and less than 20.

10. The double-cone device of claim 1, wherein the ratio of the exit diameter of the exit unit to the diameter of the orifice is greater than 5 and less than 20.

11. The double-cone device of claim 1, wherein the entry unit conicity is less than 8 degrees.

12. The double-cone device of claim 11, wherein the entry unit conicity is less than 6 degrees.

13. The double-cone device of claim 1, wherein the quality function is less than 0.05.

14. The double-cone device of claim 13, wherein the quality function is less than 0.0250.

15. The double-cone device of claim 14, wherein the quality function is less than 0.0155.

16. The double-cone device of claim 15, wherein the quality function is less than 0.0035.

17. The double-cone device of claim 1, wherein a ratio of the placement distance to the diameter of the orifice is at least equal to 0.1.

18. The double-cone device of claim 1, wherein the inlet opening includes a gap width and the exit unit includes a plurality of parts that are adjustable with respect to one another in an area of the inlet opening to adjust the gap width of the inlet opening.

19. The double-cone device of claim 1, wherein the inlet opening includes a plurality of openings arranged on a circumference of a circle in a plane transverse to the longitudinal axis, the double-cone device further comprising:
a conical ring rotatably attached to the exit unit and having a plurality of openings respectively assigned to the openings of the inlet opening, the conical ring being rotatable between an open position and a closed position, the openings of the conical ring coinciding with the openings of the inlet opening in the open position, the openings of the conical ring being offset with respect to the openings of the inlet opening in the closed position.

20. A closed loop installation, comprising:
a fluid path for guiding a first fluid therethrough;
a pump connected to the fluid path to pump the first fluid through the closed loop;
at least one loop outlet to permit at least a portion of the first fluid to exit the fluid path;
at least one separating unit connected to one of the closed loop and the loop outlet to separate components from the first fluid in the closed loop; and
a double-cone device connected to the fluid path to create a pressure difference in the first fluid, the double-cone device including an entry unit having a substantially frustoconical shape, the entry unit including first and second ends having respective diameters, the diameter of the first end of the entry unit being smaller than the diameter of the second end of the entry unit; and an exit unit having a substantially frustoconical shape, the exit unit including first and second ends having respective diameters, the diameter of the first end of the exit unit being smaller than the diameter of the second end of the exit unit, the entry and exit units being coupled to one another at the respective first ends to define an orifice and a longitudinal axis extending therethrough, the exit unit further including at least one inlet opening provided at a placement distance along the longitudinal axis from the first end of the exit unit such that a section of the exit unit between the first end of the exit unit and the inlet opening has an increasing diameter.

21. The closed loop installation of claim 20, wherein the at least one separating unit is operable to permit a mass exchange between a second fluid and the first fluid in the fluid path, the separating unit being connected to the loop outlet and to the inlet of the double-cone device, the loop outlet being operable to permit the first fluid to exit the fluid path, the first separating unit and the inlet of the double-cone device being operable to permit the second fluid to enter the fluid path, whereby a concentration of matter to be separated in the entering second fluid is reduced.

22. The closed loop installation of claim 21, wherein the separating unit is an osmosis unit.

23. The closed loop installation of claim 20, wherein the at least one separating unit includes a first separating unit connected to the loop outlet and operable to separate matter from the first fluid to recover at least one of a purified and a concentrated fluid from the fluid path.

24. The closed loop installation of claim 23, wherein the at least one separating unit separates the matter by one of osmosis, reverse osmosis, filtration, cyclone effect, and chromatography.

25. The closed loop installation of claim 20, wherein the at least one separating unit is connected to the fluid path to separate matter from the first fluid.

26. The closed loop installation of claim 25, wherein the at least one separating unit includes one of an osmosis unit, a reverse osmosis unit, a cyclone, a separating column, and a tower.

27. The closed loop installation of claim 26, wherein the at least one separating unit is connected to the fluid path upstream of the pump, the separating unit being operable to remove at least one of corrosive, abrasive and aggressive matter from the first fluid to protect the pump.

28. The closed loop installation of claim 20, further comprising a second pump connected to the inlet opening of the double-cone device to improve a supply of the first fluid to the double-cone device.

29. The closed loop installation of claim 20, wherein the first fluid includes sea water, the closed loop installation being operable to desalinate the sea water.

30. The closed loop installation of claim 20, wherein the first fluid includes water, the closed loop installation being operable to separate contaminants from the water.

31. The closed loop installation of claim 30, wherein the contaminants include oil.

* * * * *